US012645943B2

(12) United States Patent

Teig

(10) Patent No.: US 12,645,943 B2

(45) Date of Patent: Jun. 2, 2026

(54) MACHINE LEARNING THROUGH MULTIPLE LAYERS OF NOVEL MACHINE TRAINED PROCESSING NODES

(71) Applicant: Amazon Technologies, Inc., Seattle, WA (US)

(72) Inventor: Steven L. Teig, Menlo Park, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/407,173

(22) Filed: Jan. 8, 2024

(65) Prior Publication Data

US 2024/0370729 A1 Nov. 7, 2024

Related U.S. Application Data

(63) Continuation of application No. 17/187,638, filed on Feb. 26, 2021, now Pat. No. 11,868,898, which is a continuation of application No. 15/231,789, filed on Aug. 9, 2016, now Pat. No. 10,936,951.

(60) Provisional application No. 62/295,110, filed on Feb. 14, 2016.

(51) Int. Cl.
*G06N 3/084* (2023.01)
*G06N 3/048* (2023.01)

(52) U.S. Cl.
CPC ............. *G06N 3/084* (2013.01); *G06N 3/048* (2023.01)

(58) Field of Classification Search
CPC ................................ G06N 3/084; G06N 3/048
See application file for complete search history.

(56) References Cited

U.S. PATENT DOCUMENTS 6,463,438 B1 * 10/2002 Veltri ................... G06V 20/695
706/15
2018/0197049 A1 * 7/2018 Tran ....................... G06N 3/084

OTHER PUBLICATIONS

Bilgili et al. "Applications of CNN with Trapezoidal Activation Function", Brain-like and Wave-oriented Electrodynamic Algorithms, 2006, pp. 225-242.*
Sruthi et al. "Curvelet Transform based Image De-noising using Feed Forward Artificial Neural Network", IJ VLSI System, 2015, pp. 5.*

* cited by examiner

Primary Examiner — Li Wu Chang
(74) Attorney, Agent, or Firm — K&L Gates LLP

(57) ABSTRACT

Some embodiments of the invention provide efficient, expressive machined-trained networks for performing machine learning. The machine-trained (MT) networks of some embodiments use novel processing nodes with novel activation functions that allow the MT network to efficiently define with fewer processing node layers a complex mathematical expression that solves a particular problem (e.g., face recognition, speech recognition, etc.). In some embodiments, the same activation function (e.g., a cup function) is used for numerous processing nodes of the MT network, but through the machine learning, this activation function is configured differently for different processing nodes so that different nodes can emulate or implement two or more different functions (e.g., two or more Boolean logical operators, such as XOR and AND). The activation function in some embodiments is a periodic function that can be configured to implement different functions (e.g., different sinusoidal functions).

9 Claims, 12 Drawing Sheets

Width W1, where W1<W2

Novel Shallow Neural Network

VS

Traditional Deeper Neural Network

Width W2

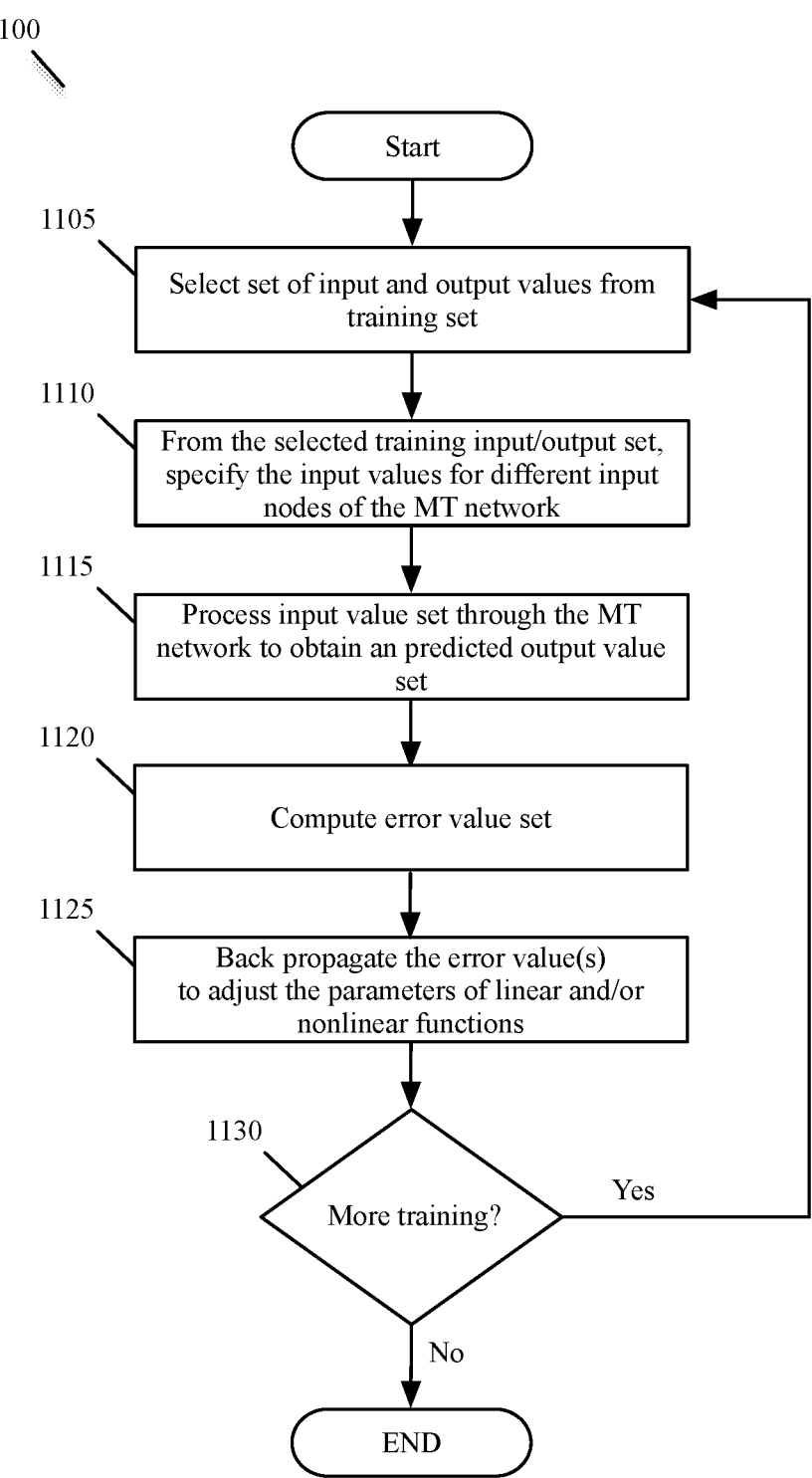

1100

Start

1105
Select set of input and output values from training set

1110
From the selected training input/output set, specify the input values for different input nodes of the MT network 1115
Process input value set through the MT network to obtain an predicted output value set 1120
Compute error value set 1125
Back propagate the error value(s) to adjust the parameters of linear and/or nonlinear functions 1130
More training?

Yes

No

END

| Operating System Instructions 1572 |
| GUI Instructions          1576 |
| Image Processing Instructions 1578 |
| Input Processing Instructions 1580 |
| Audio Processing Instructions 1582 |
| Camera Instructions      1584 |

1570 — Memory

1510 — Memory Interface

1505 — Processing Unit(s)

Peripherals Interface

1515

1520 — Camera Subsystem

1540

Other sensors

1545

Audio Subsystem

1530

1535 — I/O Subsystem

1555 — Touch-Screen Controller

1560 — Other Input Controller(s)

MACHINE LEARNING THROUGH MULTIPLE LAYERS OF NOVEL MACHINE TRAINED PROCESSING NODES

CLAIM OF BENEFIT TO PRIOR APPLICATIONS

This application is a continuation application of U.S. patent application Ser. No. 17/187,638, filed Feb. 26, 2021 and now issued as U.S. Patent Publication 2021/0182689. U.S. patent application Ser. No. 17/187,638 is a continuation application of U.S. patent application Ser. No. 15/231,789, filed Aug. 9, 2016 and now issued as U.S. Pat. No. 10,936, 951. U.S. patent application Ser. No. 15/231,789 claims the benefit of U.S. Provisional Patent Application 62/295,110, filed Feb. 14, 2016. U.S. patent application Ser. No. 15/231, 789, now issued as U.S. Pat. No. 10,936,951, and U.S. patent application Ser. No. 17/187,638, now published as U.S. Patent Publication 2021/0182689, are incorporated herein by reference.

BACKGROUND

In recent years, there has been a dramatic increase in the use of machine learning applications. In large part, this increase has been fueled by increases in the computational resources of computers and the plethora of available compute power that is provided relatively cheaply in many private and public datacenters. Because of the availability of this compute power, many machine-learning applications are deep machine learning applications that utilize many layers of processing nodes. Such deep learning processes require lots of computational resources, which are available in datacenters, but are often lacking in the outside world where devices have more limited computational resources.

SUMMARY

Some embodiments of the invention provide efficient, expressive machined-trained networks for performing machine learning. The machine-trained (MT) networks of some embodiments use novel processing nodes with novel activation functions that allow the MT network to efficiently define with fewer processing node layers a complex mathematical expression that solves a particular problem (e.g., face recognition, speech recognition, etc.). In some embodiments, the same activation function is used for numerous processing nodes of the MT network, but through the machine learning, this activation function is configured differently for different processing nodes so that different nodes can emulate or implement two or more different functions (e.g., two different periodic functions, two different logical Boolean operators, etc.).

In some embodiments, the processing nodes include activation operators that can emulate two or more Boolean logical operators. For instance, in some embodiments, the activation operators emulate operators in either the XOR family of operators (e.g., XOR, XNOR, etc.) or in the AND family of operators (e.g., AND, NAND, etc.). These operators in some embodiments have the same functional expression, but can emulate different logical operators based on the values of the constant parameters used in their functional expression.

For example, the activation function of the MT network of some embodiments is a non-monotonic function that can be adjusted during machine training to emulate different Boolean logical operators. One example of a non-monotonic function is a cup function. During the training of the MT network, some embodiments adjust the constant parameters of the activation functions of the network, by having the network process input data sets with known output data sets and back propagating the errors in the network-generated output data sets through the processing nodes of the network. When the processing nodes of the MT network can implement at least two different logical operators, the MT network can formulate a much richer set of mathematical expressions. This, in turn, allows the MT networks to be much smaller, which then allows them to be implemented on a much wider range of devices, including devices with more limited computational and memory resources.

In some embodiments, the activation function is a periodic function. A periodic function can be expressed as $f(x+p)=f(x)$ for all x, given a period p. A periodic activation function has several advantageous properties. For example, in the embodiments in which each processing node includes a linear function and a non-linear activation function, just two layers of such processing nodes can perform a Fourier transform. This is because (1) each activation function can be configured to implement a sin(x), sin(k*x), cos(x), or cos(k*x) function, and (2) the output of a set of activation functions in the first layer can be supplied to a linear function in the second layer to sum up the activation function outputs. This allows N+1 layers of processing nodes with linear operators and periodic activation operators to express up to N layers of Fourier transforms. Periodic activation operators can also be configured in some embodiments to emulate cup functions, ReLU functions, or sigmoid functions. In addition to Fourier transforms, periodic processing nodes can also implement other transforms such as wavelet transforms, Walsh-Hadamard transforms, etc.

Because of their periodic nonlinear operators, the periodic processing nodes (i.e., processing nodes that use periodic activation functions) of some embodiments consume fewer computational resources to perform their linear functions. For instance, in some embodiments, the linear function of a periodic processing node mathematically (1) computes a dot product of its inputs with machine-trained weight values associated with the inputs (i.e., computes a sum of each of its input multiplied with a respective machine-trained weight value for that input), and (2) computes a modulo division (also called mod below) of the output of the dot product with the period of the periodic function. However, in order to implement this dot product with lower resolution multipliers and adders, the linear function in some embodiments takes advantage of the modular arithmetic properties to reduce the magnitude of its input values and weight values before computing the dot product. Specifically, in some embodiments, the linear function first computes the modulo division of the weight values with the period and the modulo division of the inputs with the period, then computes a dot product of the input set and weight set that remains after the modulo operations, and then performs another modulo division on the output of the dot product with the period. This allows the dot product to result in smaller numbers, which, in turn allows lower resolution multipliers and adders to be used to perform the multiplications and the sum associated with the dot product.

When the periodic function's period is a power of 2, then the dot product can be performed with low-resolution arithmetic, e.g., 4-bit multiplies instead of 16- or 32-bit. Thus, periodic-processing nodes are not only far more expressive than traditional processing nodes but can be significantly smaller, faster, and lower power as well. Moreover, when the period of the periodic function is a power of 2, the mod operator is computationally inexpensive, as it is just a bit mask that involves taking the desired bits and discarding the rest of the unneeded bits.

Some embodiments adjust the amplitude of the periodic activation functions during the machine learning process, while other embodiments do not control the amplitude of the periodic functions for full expressiveness since these embodiments rescale the final output of these functions. Some embodiments have the phase of the periodic functions adjusted during the machine learning process. Some embodiments also adjust during the machine learning the relative widths of the lower and the upper portions of the periodic function (i.e., the bottom valleys and/or top mesas of the periodic function).

Other embodiments use other types of novel processing nodes. For instance, some embodiments have a multi-layer MT network that like some of the above-described networks includes several layers of processing nodes, with each node having linear operator (i.e., linear component) and a periodic nonlinear operator (i.e., a periodic non-linear component), and each node's linear operator computing a dot product of a set of outputs of periodic nonlinear operators of other processing nodes with a set of weight values. However, in these embodiments, the processing node do not compute a modulo division on the output of the linear operator before supplying this output to its periodic non-linear operator. In these embodiments, the output of the dot product computed by the node's linear operator is supplied "as is" to the node's periodic nonlinear operator.

Other embodiment, on the other hand, use the modulo division in conjunction with a non-periodic, non-linear operator. Specifically, in these embodiments, each processing node in multiple layers of processing nodes of the MT network has a linear operator (i.e., linear component) and a nonlinear, non-periodic operator (i.e., a non-linear, non-periodic component). Again, in some of these embodiments, the linear operator of each node computes a dot product of a set of outputs of nonlinear operators of other processing nodes with a set of weight values. In these embodiments, the processing node then computes a modulo division on the output of the linear operator (i.e., on the dot product output) before supplying this modulo-divided output to its non-linear operator. In other embodiments, the node's linear operator performs the modulo division on the weight values and the outputs of the nonlinear operators of other processing nodes, before computing the dot product based on the result of the modulo division operations (i.e., based on the set of weight values and the set of output values after the modulo operation), and then computing another modulo division operation on the output of the dot product. The modulo operation in some embodiments is performed based on a number that defines a range of input values for the nonlinear operator. The modulo operation renders the non-periodic non-linear operator into a periodic non-linear operator as it confines this operator's input values to a particular range of values, which confines its output values to another particular range.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

FIG. 11 illustrates the back-propagation process that the modules of FIG. 10 perform.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide efficient, expressive machined-trained networks for performing machine learning. The machine-trained (MT) networks of some embodiments use novel processing nodes with novel activation functions that allow the MT network to efficiently define with fewer processing node layers a complex mathematical expression that solves a particular problem (e.g., face recognition, speech recognition, etc.). In some embodiments, the same activation function is used for numerous processing nodes of the MT network, but through the machine learning, this activation function is configured differently for different processing nodes so that different nodes can emulate or implement two or more functions (e.g., two different periodic functions, two different logical Boolean operators, etc.).

This configurability of the activation functions allows the MT network of some embodiments to use fewer layers of processing nodes than other more traditional MT networks to express the same mathematical problems. The shallower MT network of some embodiments require fewer computational and memory resources to implement. Thus, the shallower MT network of these embodiments can be implemented on a wider variety of devices, including devices with more limited computational and memory resources. Examples of such resource-constrained devices include mobile devices (e.g., smartphones, tablets, etc.), IoT (Internet of Things) devices, laptops, desktops, etc.

Figure 1:
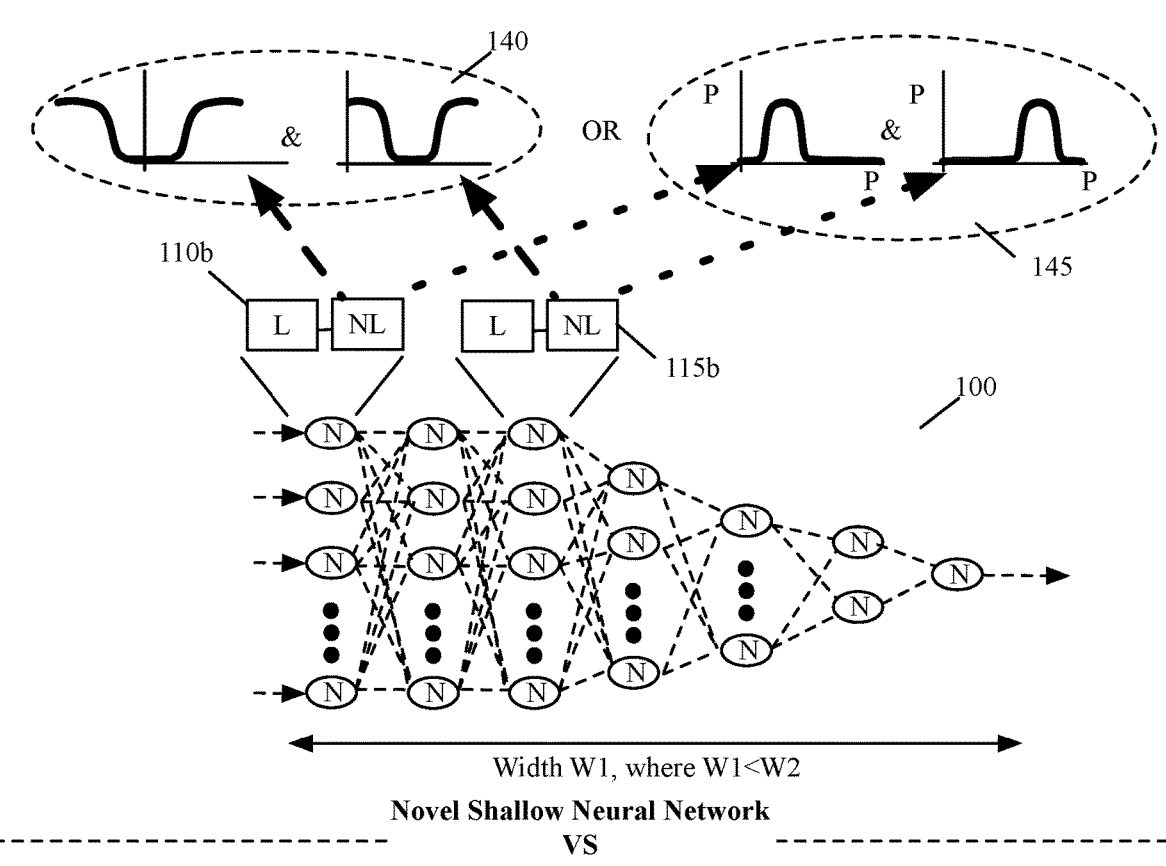
FIG. 1 provides an example that contrasts the shallower machine trained (MT) network of some embodiments with a more traditional deeper MT network that is commonly used today.

FIG. 1 provides an example that contrasts the shallower MT network 100 of some embodiments with a more traditional deeper MT network 105 that is commonly used today. Both networks 100 and 105 are feed forward networks that have multiple layers of processing nodes, with each processing node in all but the last layer receiving two or more outputs of processing nodes from earlier processing node layers and providing its output to one or more processing nodes in subsequent layers. The connections between processing nodes are only illustrated in FIG. 1, and are omitted in the subsequent figures in order not to obscure the presentation of the subsequent figures with unnecessary detail.

The output of the processing node in the last layer represents the output of the MT network 100 or 105. In some embodiments, the output of the MT network 100 is a number in a range of values (e.g., 0 to 1, or 0 to 360 degrees). In this example, the MT network 100 only has one output node 150. The MT network of other embodiments has two or more output nodes that provide two or more output values. Also, the MT network of other embodiments is not a feed forward network (e.g., is a recurrent network, etc.).

As shown in FIG. 1, each processing node in either network 100 or 105 has a linear component 110 and a nonlinear component 115. The linear component 110 of each processing node in this example implements a weighted sum of the inputs to the processing node (e.g., a weighted sum of the outputs of the prior processing nodes that the processing node receives). Each processing node's nonlinear component 115 computes a function based on the output of the linear component 110. This function is commonly referred to as the activation function.

Equation (A) below provides a mathematical expression for the output of processing node j in either network 100 or 105.

$$o_j = \varphi(d_j) = \varphi\left(\sum\nolimits_{k=1}^{n} w_{kj} o_k\right) \qquad \text{(A)}$$

As shown, the processing node j computes an output value $o_j$ by computing a nonlinear activation function $\varphi$ based on the output of the linear component of the processing node j. In this equation, input $d_j$ is the dot product of a set of weight values $w_{kj}$ of the linear component 110 of the node j and a set of outputs $o_k$ of the n other nodes that feed node j. As illustrated by Equation (A), the dot product is a sum of each input of the linear component multiplied by an associated weight value $w_{kj}$.

In the traditional MT network 105, the activation function can be a sigmoid function 120, a tanh function 125, a ReLU (rectified linear unit) function 130 or a leaky ReLU function 135, as shown. In the initial MT network designs, the sigmoid function and the tanh function were the activation functions of choice. More recently, the ReLU function has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv: 1502.01852, 2015.

In the novel MT network 100, the activation function of the nonlinear component 115b is a non-monotonic, cup function 140 in some embodiments, while it is a periodic function 145 in other embodiments. In the example illustrated in FIG. 1, the cup function 140 and the periodic function 145 are smooth, continuous functions. Instead of using such functions for the activation functions of the processing nodes, some embodiments use piecewise linear function (e.g., piecewise linear cup functions) that emulate the piecewise continuous functions as computing devices can perform piecewise linear function operations faster. Several example of piecewise linear functions will be described below.

A cup function is a convex function that has a trough. In some embodiments, a cup function's trough has a left side with one or more negative slopes, a right side with one or more positive slopes, and a middle section that allows the cup to transition from the negative slope(s) to the positive slope(s). Before the left side of its trough, the cup function is flat or relatively flat with smaller negative slope or slopes. The cup function is also flat or relatively flat with smaller positive slope or slopes after the right side of its trough. When the cup function is a smooth, continuous function, its trough is defined by a curve that transitions through a series of negative slopes, transitions through its mid-section, and then starts to transition through a series of positive slopes. A piecewise linear cup function, on the other hand, has at least one straight segment on the left side of its trough with a negative slope and one straight segment on its right side of its trough with a positive slope. Some embodiments use piecewise linear cup functions with more than one negative slope segment on the left side of the function's trough and more than one positive-slope segment on the right side of the function's trough.

As shown in FIG. 1, the cup function 140 of different processing nodes can be configured differently through training so that this cup function can have different shapes for different processing nodes. As further described below, the different shaped cup functions of the different processing nodes allow these processing nodes to emulate different logical operators. For example, in some embodiments, each processing node in a first set of processing nodes emulates an AND operator, while each processing node in another set of processing nodes implements an XNOR operator. To emulate Boolean operators, some embodiments treat values below a particular value in a range of values as a 0 (or False) while treating values above the particular value as a 1 (or True).

Analogously, in some embodiments, the periodic functions of different processing nodes can be configured differently through training so that the different processing nodes implement different types of periodic functions. For example, in some embodiments, the activation functions of the processing nodes can be trained to implement the following sinusoidal functions: sin(x), sin(k*x), cos(x), or cos(k*x). Instead of implementing continuous sinusoidal functions, other embodiments use piecewise linear functions that emulate such sinusoidal functions for the activation functions of their processing nodes. The periodic function 145 can be expressed as $$y = \varphi(x) = \varphi(x + p),$$

where p is a period of the periodic function and the input value x is an angle between 0 and the p.

As shown in FIG. 1, the MT network 100 of some embodiments has W1 layers of processing nodes, while the traditional MT network 105 has W2 layers of processing nodes, where W2 is larger than W1. The MT network 100 of some embodiments is shallower than traditional MT networks (such as network 105) because its nonlinear activation functions can be configured differently for different processing nodes so that different processing nodes emulate or implement two or more functions (e.g., two different periodic functions, two different logical Boolean operators, etc.). By emulating or implementing different functions, this configurability allows the MT network 100 to have fewer processing node layers than the MT networks 105 to implement the same mathematical expressions.

Figure 2:
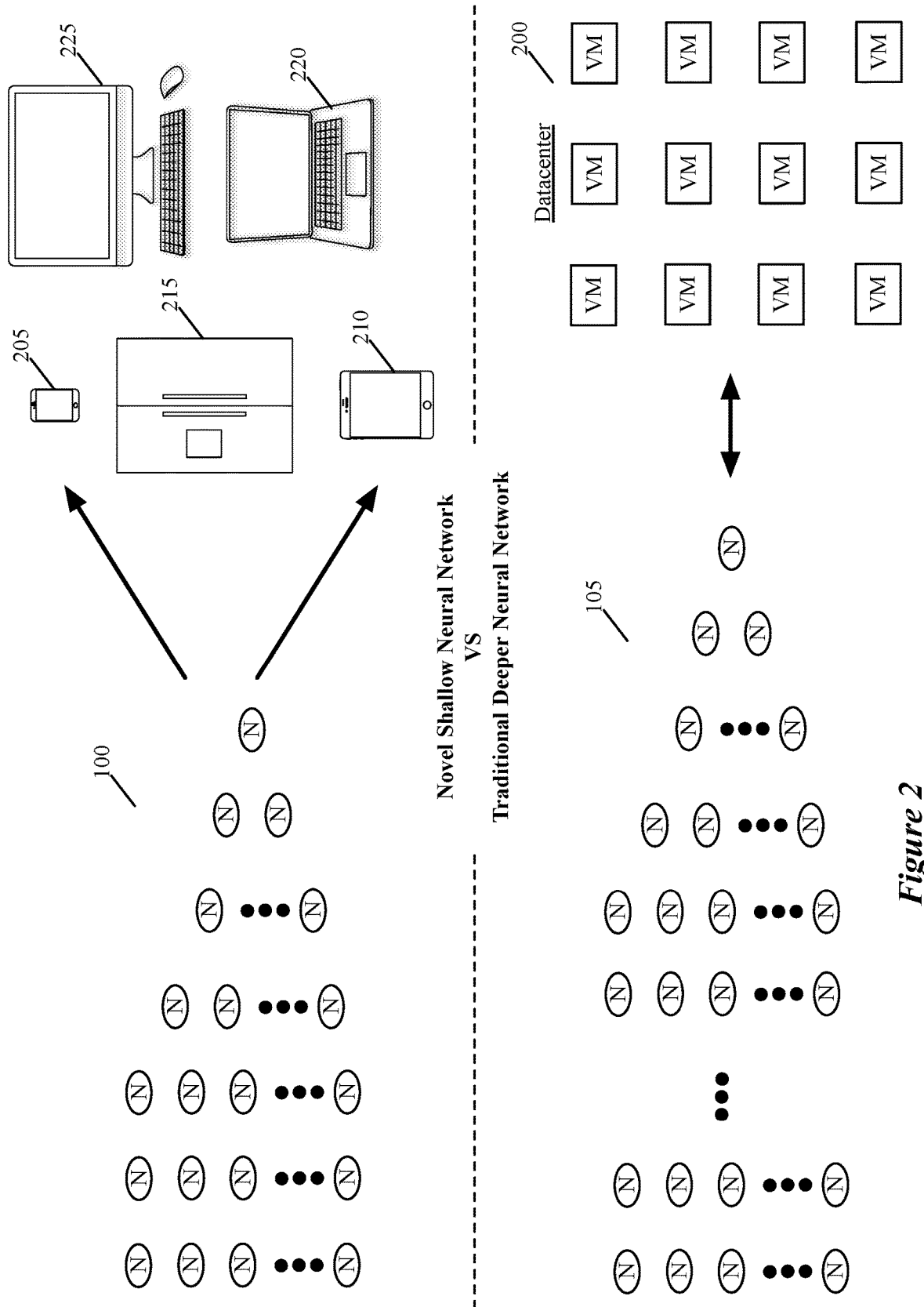
FIG. 2 illustrates that the shallower MT network of some embodiments can be implemented on a wider variety of devices than the more traditional deeper MT network.

FIG. 2 illustrates that the shallower MT network 100 of some embodiments can be implemented on a wider variety of devices than the more traditional deeper MT network 105. Specifically, it shows that while the deeper MT network 105 needs to be implemented by numerous computing devices (e.g., servers, virtual machines, etc.) in a datacenter 200, the shallower MT network 100 of some embodiments can be implemented by a single computing device, which can be a resource-constrained smartphone 205, a tablet 210, an IoT device 215, a laptop 220, a desktop 225, etc.

The shallower MT network 100 of some embodiments can also be implemented on one several machines (e.g., servers, virtual machines, etc.) in the datacenter 200. In a datacenter, the shallower MT network of some embodiments executes much faster than the deeper MT networks since the shallower MT network has fewer processing nodes to execute. Alternatively, the novel processing nodes of some embodiments are used in deeper MT networks in order to create far more powerful MT networks.

Figure 3:
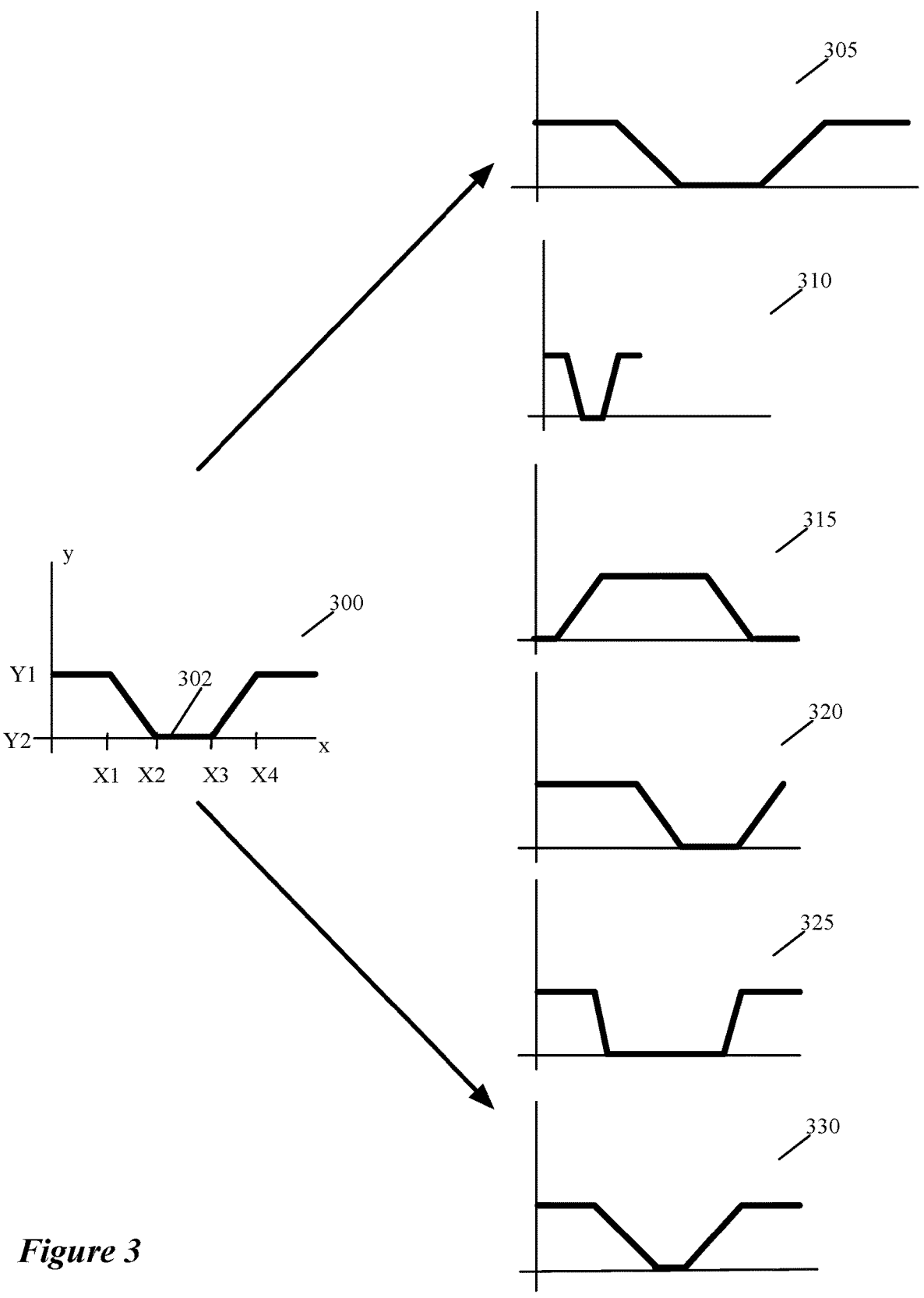
FIG. 3 illustrates a cup function that is used by some embodiments of the invention as the activation functions of MT networks.

FIG. 3 illustrates a cup function 300 that is used by some embodiments of the invention as the activation functions of MT networks. This cup function is a piecewise linear function that is defined along the x- and y-axes. This function can be expressed as follows:

$$y = Y1 \text{ for } x \le X1 \text{ or } x \ge X4;$$

-continued $$m_1 x + b_1 \text{ for } X1 < x \le X2;$$

$$m_2 x + b_2 \text{ for } X3 < x < X4; \text{ and}$$

$$Y2 \text{ for } X2 < x \le X3.$$

In this equation, $m_1$, $m_2$, $b_1$, $b_2$, X1-X4, Y1, and Y2 are all constant values. During machine training of the MT network, some embodiments adjust the X1-X4 values, or a subset of these values, of the activation functions of the processing nodes. The width of the cup function can increase or decrease through these adjustments, as illustrated by cups 305 and 310 in FIG. 3. These adjustments can also slide the location of the cup along the x-axis, as illustrated by cups 315 and 320 in FIG. 3. These adjustments can also adjust the slopes of the sidewalls of the cup as shown by cups 325 and 330 in FIG. 3. In some embodiments, the machine learning also adjusts the Y1 and Y2 values of the cup function, while this learning in other embodiments does not adjust the Y1 and Y2 values of the cup function.

Figure 4:
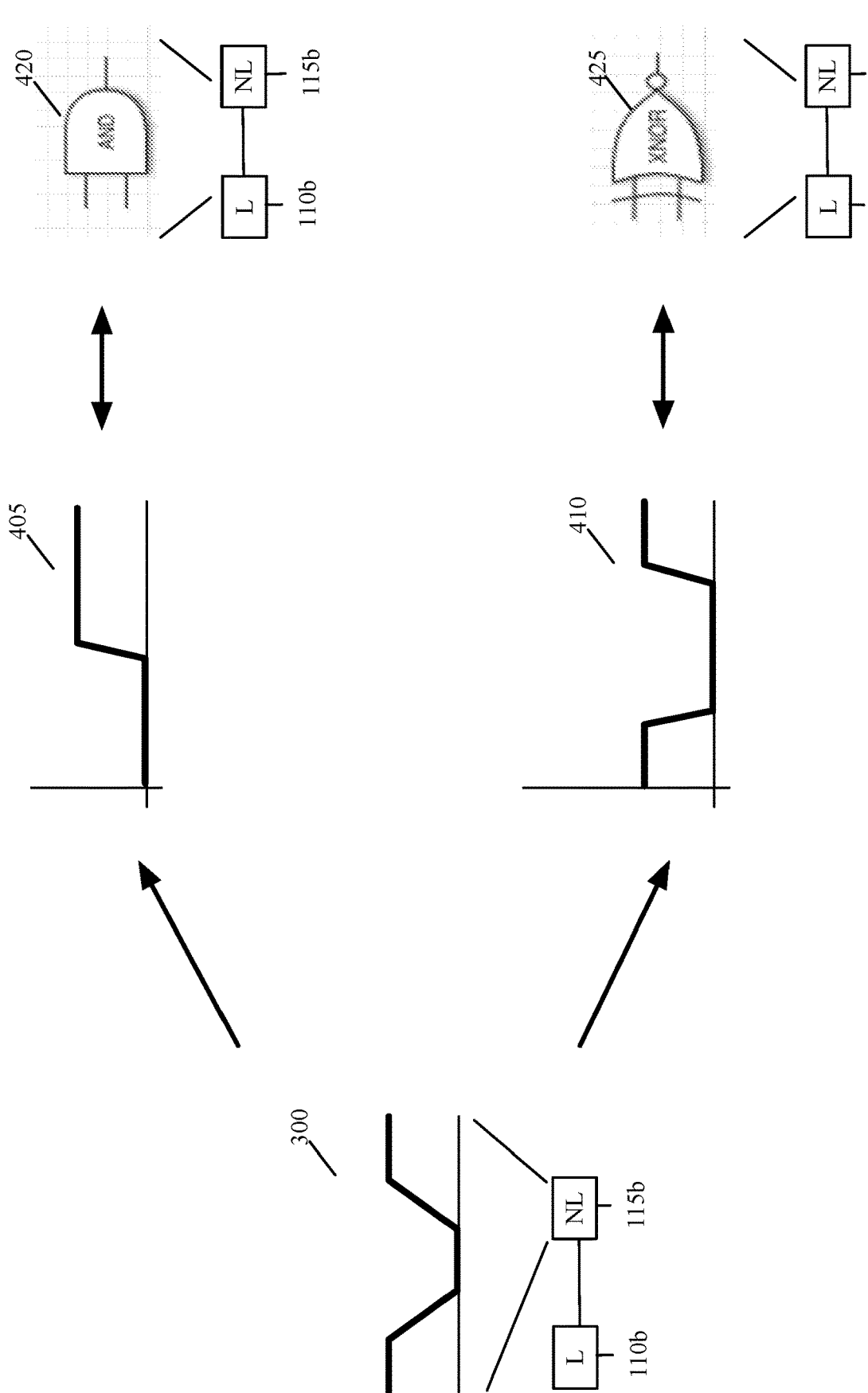
FIG. 4 illustrates that the cup function allows the processing nodes of the MT network to emulate different logical operators.

FIG. 4 illustrates that the cup function 300 allows the processing nodes of the MT network to emulate different logical operators. Specifically, it shows that when the cup function is adjusted into a first form 405 for one set of processing nodes, each such node emulates an AND operator 420. It also shows that when the cup function is adjusted into a second form 410 for another set of processing nodes, each such node can emulate an XNOR operator 425.

A processing node emulates an AND operator when its activation function outputs a large value (Y2) when the processing node's inputs are all large values, but otherwise outputs a small value (Y1) when one of the processing node's inputs is a small value. A processing node emulates an XNOR operator when its activation function (1) outputs a large value (Y2) when the processing node's inputs are either all small values or all large values, and (2) outputs a small value when one of the processing node's inputs is a small value. Having XNOR operators in the MT network is highly useful as XNOR operators serve as comparators that determine whether their input values are equal. To emulate the Boolean operators (e.g., AND and XNOR operators), the processing node in some embodiments treats output values in certain range(s) as one Boolean value (e.g., a 1 or True) and output values in other range(s) as another Boolean value (e.g., a 0 or False).

As illustrated by the examples presented in FIGS. 3 and 4, the cup activation functions of the MT network can be adjusted (e.g., through the adjustment of the X1-X4 values) to allow the processing nodes of the MT network to emulate different logical operators. When processing nodes of the MT network can implement at least two different logical operators, the MT network can formulate a much richer set of mathematical expressions. This, in turn, allows the MT networks to be much smaller, which then allows them to be implemented on a much wider range of devices, including devices with more limited computational and memory resources.

Figure 5:
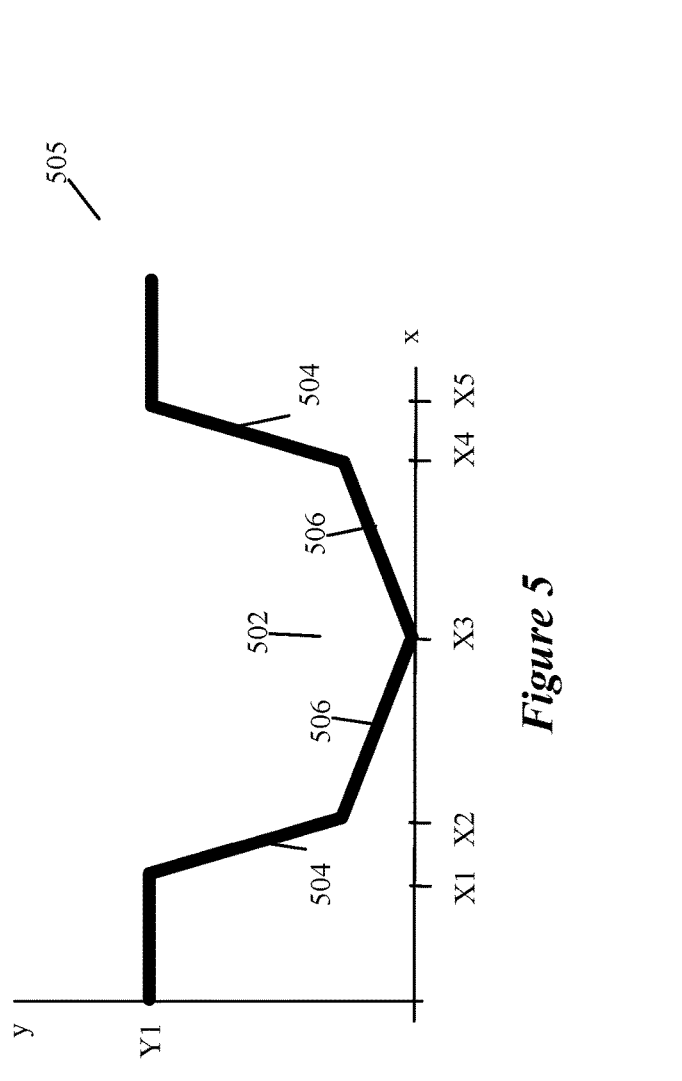
FIG. 5 illustrates another piecewise linear cup function that is used by some embodiments of the invention as the activation functions of different MT networks.

FIG. 5 illustrates another piecewise linear cup function 505 that is used by some embodiments of the invention as the activation functions of different MT networks. This cup function is a variation of the cup function 300 of FIG. 3. The cup function 505 is similar to the cup function 300, except that instead of the flat base 302 of cup 300, the base 502 of cup 505 is convex. This base 502 is formed by two line segments 506 with slopes that are smaller than the slopes of the sidewalls 504 of the cup. The cup 505 has the convex base 502 because the slopes of the line segments provide directional guidance during the back propagation operations that push back the error values obtaining during training to adjust the weight values of the linear functions and/or the parameters of the activation functions.

The cup 505 can be expressed as:

$$y = Y1 \text{ for } x \leq X1 \text{ or } x \geq X5;$$

$$m_1 x + b_1 \text{ for } X1 < x \leq X2;$$

$$m_2 x + b_2 \text{ for } X2 < x \leq X3; \text{ and}$$

$$m_3 x + b_3 \text{ for } X3 < x \leq X4;$$

$$m_4 x + b_4 \text{ for } X4 < x < X5;$$

In this equation, $m_1$, $m_2$, $m_3$, $m_4$, $b_1$, $b_2$, $b_3$, $b_4$, X1-X5, Y1, and Y2 are all constant values. During machine training of the MT network, some embodiments adjust some or all of these constant values of the activation functions of the processing nodes.

Figure 6:
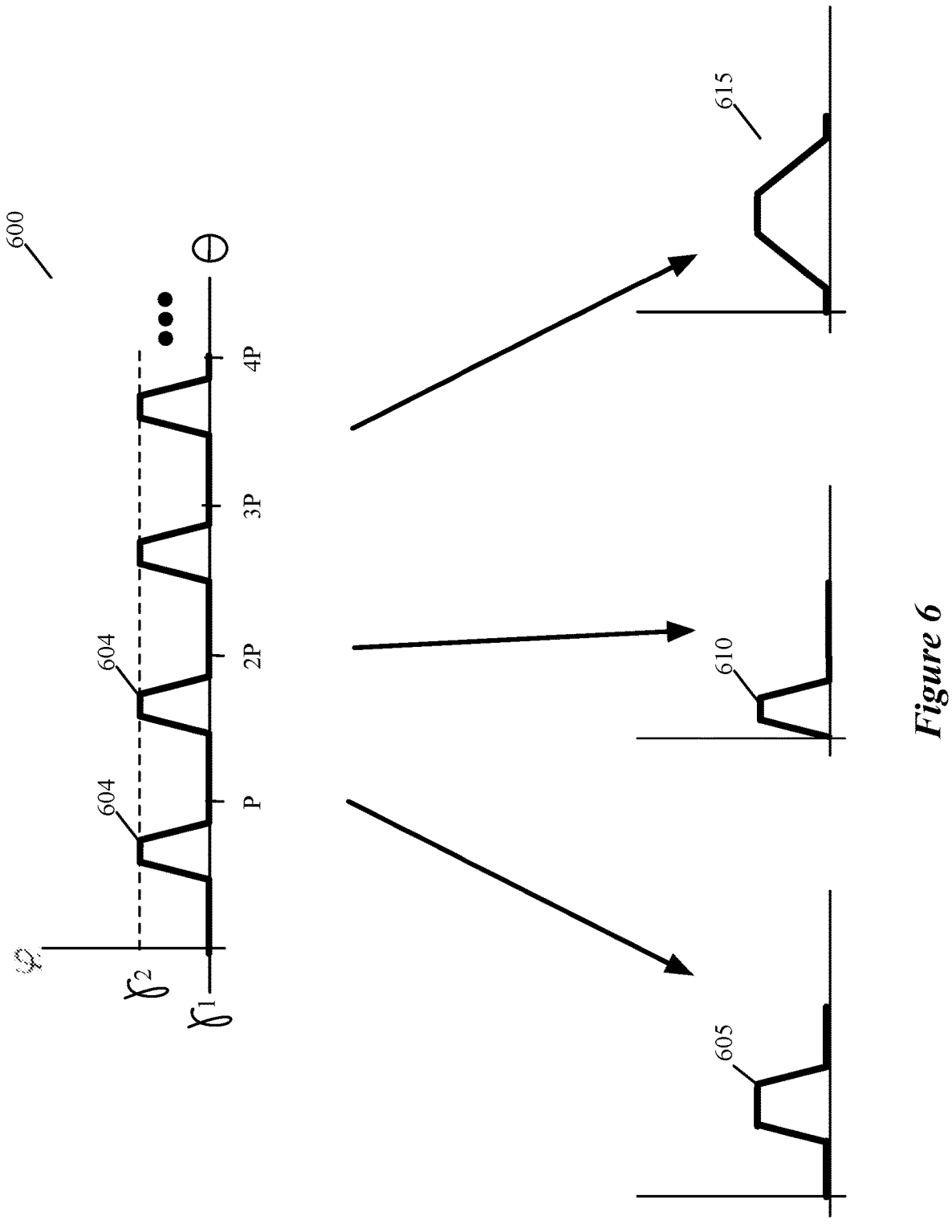
FIG. 6 illustrates a periodic activation function that is used by some embodiments of the invention as the nonlinear components of MT networks.

In some embodiments, the activation function is a periodic function, which can be expressed as $\varphi(x)=\varphi(x+p)$, for all x and given a period p. FIG. 6 illustrates a periodic activation function 600 that is used by some embodiments of the invention as the nonlinear components of MT networks. In this example, the periodic function is a piecewise linear function that receives an angular input between 0 and the period p because of a prior modulo operation, as described above and further described below. This function can be expressed as follows:

$$\varphi = \gamma1 \text{ for } \theta \leq \alpha1 \text{ or } \theta \geq \alpha4;$$

$$m_1 \theta + b_1 \text{ for } \alpha1 < \theta \leq \alpha2;$$

$$m_2 \theta + b_2 \text{ for } \alpha3 < \theta < \alpha4; \text{ and}$$

$$\gamma2 \text{ for } \alpha2 < \theta \leq \alpha3$$

In this equation, $m_1$, $m_2$, $b_1$, $b_2$, $\alpha1$-$\alpha4$, $\gamma1$, and $\gamma2$ are all constant values.

During machine training of the MT network, some embodiments adjust the $\alpha1$-$\alpha4$, m1, m2, b1, and b2 values of the activation functions, or a subset of these values, of the processing nodes. The width of the bump 604 in this function can increase or decrease through these adjustments, as illustrated by bump 605 in FIG. 6. These adjustments can also slide the location of the bump 604 along the input axis, as illustrated by bump 610 in FIG. 6. These adjustments can also adjust the slopes of the sidewalls of the bump as shown by bump 615 in FIG. 6. In some embodiments, the machine learning also adjusts the $\gamma1$ and $\gamma2$ values of the periodic function, while the machine learning in other embodiments does not adjust the $\gamma1$ and $\gamma2$ values of the periodic function. Some embodiments have the phase of the periodic operators adjusted during the machine learning process.

The periodic activation function (such as function 600 of FIG. 6) are referred as cirque functions below. Similarly, processing nodes that use periodic activation functions are referred to as cirque processing nodes. A cirque activation function has several advantages. For example, in the embodiments in which each processing node includes a linear function and a non-linear cirque activation function, just two layers of such processing nodes (formed by the non-linear cirque activation functions of a first layer and a linear component in a subsequent second layer) can perform a Fourier transform. This allows N+1 layers of cirque processing nodes to express up to N layers of Fourier transforms. Cirque operators can also be configured in some embodiments to emulate cup functions, ReLU functions, or sigmoid functions. In addition to Fourier transforms, cirque processing nodes can also implement other transforms such as wavelet transforms, Walsh-Hadamard transforms, etc.

Figures 7, 9:
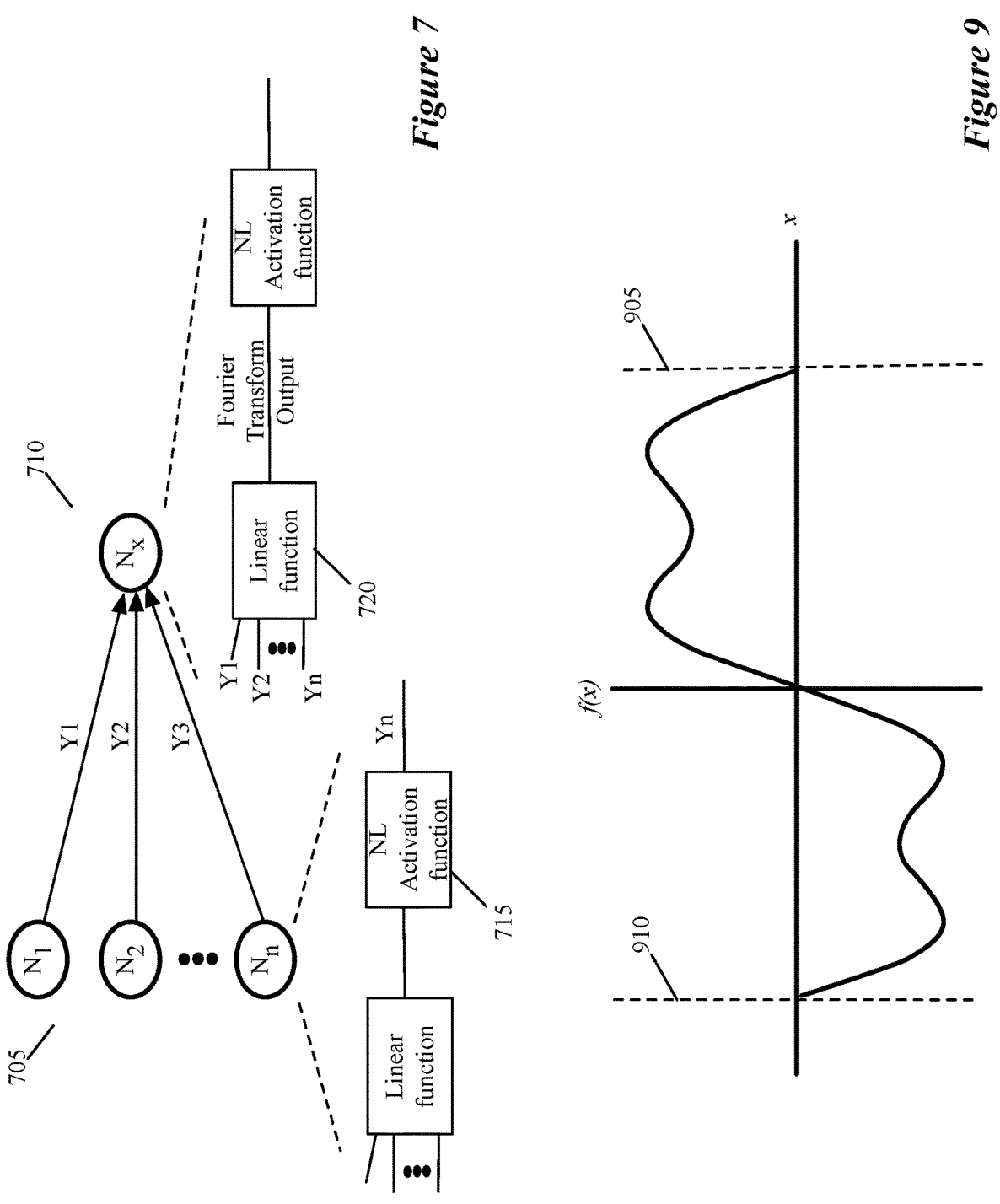
FIG. 7 presents an example that illustrates two layers of cirque processing nodes defining a Fourier transform.
FIG. 9 illustrates another periodic function, which is referred to as a sin-derived cirque function.

FIG. 7 presents an example that illustrates two layers of cirque processing nodes defining a Fourier transform. Just two layers 705 and 710 of cirque processing nodes can implement or emulate a Fourier transform because (1) each cirque activation function 715 can be configured to implement or emulate sinusoidal function (e.g., sin(x), sin(k*x), cos(x), or cos(k*x) function), and (2) the sinusoidal output of a set of cirque activation functions in the first layer 705 can be supplied to a linear function 720 in the second layer 710 to sum up the cirque function outputs. Having just two layers of cirque processing nodes emulate or implement a Fourier transform is quite powerful. For instance, just two such layers can extract notes played by a particular instrument (e.g., an oboe) in a concert recording in order to reproduce these notes on a music sheet.

Since the cirque operator is periodic, the cirque processing nodes (i.e., processing nodes that use cirque activation functions) consume fewer computational resources to perform their linear functions. For instance, in some embodiments, the linear function of a cirque processing node mathematically (1) computes a dot product of its input with machine-trained weight values associated with the inputs, and (2) computes a modulo division of the result of the dot product with the period of the cirque function, before providing the result of the modulo division to the cirque activation operator of the processing node. The modulo division is performed because different input values to the cirque activation operator result in the same output from this operator when the input values are offset by the period p of this operator. This relationship was expressed above as $\varphi(x)=\varphi(x+p)$, for all x and given a period p.

However, in order to implement its dot product with lower resolution multipliers and adders, a cirque node's linear function in some embodiments takes advantage of the modular arithmetic properties to reduce the magnitude of its input values and weight values before computing the dot product. Specifically, in some embodiments, the cirque's linear function first computes the modulo division of its weight values with the period and the modulo division of its inputs with the period, then computes a dot product of the input set and weight set that remains after the modulo operations, and then performs another modulo division on the output of the dot product with the period. The second part of Equation (B) below expresses this computation, while the first part expresses the dot product modulo period operation that the linear function is mathematically computing.

$$d_i = \left(\sum\nolimits_{k=1}^{n} w_{ki} * y_k\right) \bmod p = \left(\left(\sum\nolimits_{k=1}^{n} w_{ki} \bmod p\right) * (y_k \bmod p)\right) \bmod p \quad \text{(B)}$$

By performing the modulo divisional on the weight values and the inputs, the dot product results in smaller numbers, which, in turn allows lower resolution multipliers and adders to be used to perform the multiplications and the sum associated with the dot product. When the cirque function's period is a power of 2, then the dot product can be performed with low-resolution arithmetic, e.g., 4-bit multiplies instead of 16- or 32-bit. Moreover, when the period of the period function is a power of 2, the mod operator is computationally inexpensive, as it is just a bit mask that involves taking the desired bits and discarding the unneeded bits. Thus, cirque-processing nodes are not only far more expressive than traditional processing nodes but can be significantly smaller, faster, and lower power as well.

Figure 8:
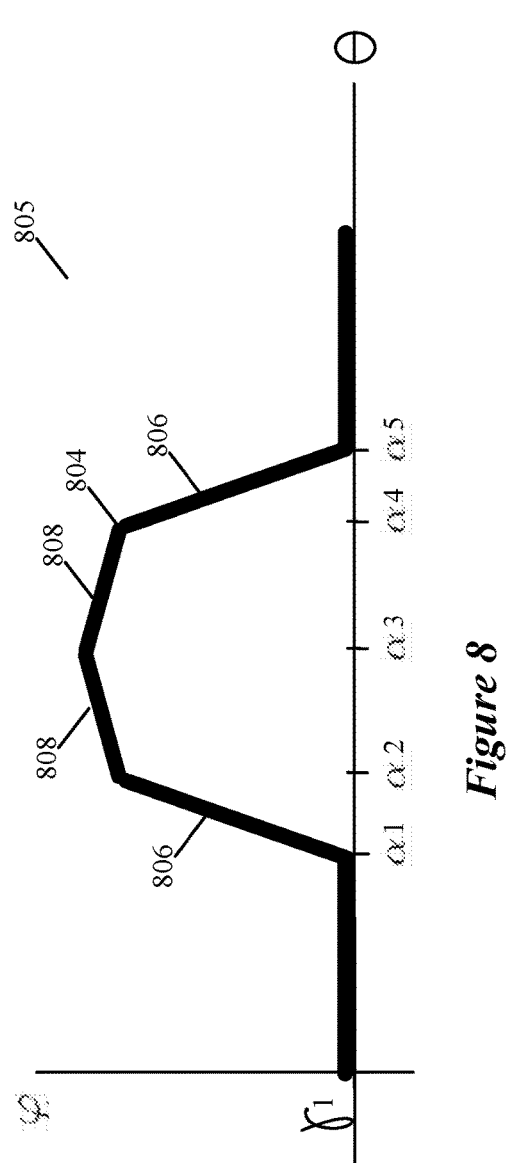
FIG. 8 illustrates another piecewise linear periodic function that is used by some embodiments of the invention as the activation functions of different MT networks.

FIG. 8 illustrates another piecewise linear periodic function 805 that is used by some embodiments of the invention as the activation functions of different MT networks. This periodic function 805 is a variation of the periodic function 600 of FIG. 6. The function 805 is similar to the function 600, except that instead of having one pair of sidewall form the hump 604, the hump 804 of function 805 is formed by two pairs of sidewalls. The first pair of sidewalls 806 have a larger slope than the second pair of sidewalls 808. The second pair of sidewalls 808 provide an angular top for the hump 804 in contrast to the flat top of the hump 604. The slope of the second pair of sidewalls 808 provide directional guidance during the back propagation operations that push back the error values computed during training to adjust the weight values of the linear functions and/or the parameters of the activation functions.

The periodic function 805 can be expressed as:

$$\varphi = \gamma1 \text{ for } \theta \le \alpha1 \text{ or } \theta \ge \alpha5;$$

$$m_1\theta + b_1 \text{ for } \alpha1 < \theta \le \alpha2;$$

$$m_2\theta + b_2 \text{ for } \alpha2 < \theta \le \alpha3; \text{ and}$$

$$m_3\theta + b_3 \text{ for } \alpha3 < \theta \le \alpha4; \text{ and}$$

$$m_4\theta + b_4 \text{ for } \alpha4 < \theta < \alpha5.$$

In this equation, $m_1$, $m_2$, $m_3$, $m_4$, $b_1$, $b_2$, $b_3$, $b_4$, $\alpha1$-$\alpha5$, and $\gamma1$ are all constant values. During machine training of the MT network, some embodiments adjust some or all of these constant values of the activation functions of the processing nodes.

The cirque activation operators of other embodiments use other periodic function, e.g., periodic cup functions. FIG. 9 illustrates another periodic function 900, which is referred to as a sin-derived cirque function. Equation (C) expresses this function as:

$$f(x) = \frac{4}{\pi}\left(\sin x + \frac{\sin(3x)}{3} + \frac{\sin(5x)}{5}\right) \qquad (C)$$

where $f(x)$ is a node's activation function and x is the input of this function (i.e., the output of the node's linear component). In this equation, the multiplier $4/\pi$ is not necessary. In FIG. 9, the boundary edges 905 and 910 of the function $f(x)$ are identified with dashed lines in order to identify where this periodic function repeats. These "identified edges" provide an alternative way of representing a periodic function on a graph to the multi-waveform illustration of FIG. 6.

Some embodiments use variations of this function for the activation functions. For instance, the sin-derived cirque function of some embodiments has more than three sin components, e.g., has four or more sin(kx)/k components, where k can be any odd number in a sequence of four or more successive odd numbers starting from 1. As K increases, the sum of sin(kx) results in a waveform that will get closer and closer to a square wave, shown in dashed lines, and thereby produces an improved approximation to a relatively flat mesa. Increasing K increases the complexity of the activation function, but to offset this complexity, some embodiments pre-tabulate this function and its derivative to conserve computation resources and to speed up forward and backward propagation operations that use such a cirque function for the activation functions of the MT network nodes. The derivative of the sin-derived cirque function of Equation (C) will be described below.

Like the function 805 of FIG. 8, the function 900 of FIG. 9 has a top portion 920 that is not flat. The varying slope of this top portion provides provide directional guidance during the back propagation operations. The rising and falling edges of this function have inflection points at which their second derivatives switch between positive values and negative values.

In some embodiments, the half-period value H of the function t(x) is a power of 2 value. This allows the modular division operations to be very easy to compute for fixed-point data. Also, instead of using the function t(x), some embodiments use s(x) which equals t(x) plus 1. This allows the s(x) function to always be positive, as the t(x) function output swings between −1 and 1. Instead of the function t(x) or s(x), some embodiments use piecewise linear approximations to these functions for their activation operators. Also, while various piecewise linear functions were described below, some embodiments use piecewise polynomial functions to define their periodic activation operators.

Other embodiments use other types of novel processing nodes. For instance, some embodiments have a multi-layer MT network that like some of the above-described networks includes several layers of processing nodes, with each node having linear operator (i.e., linear component) and a periodic nonlinear operator (i.e., a periodic non-linear component), and each node's linear operator computing a dot product of a set of output of periodic nonlinear operators of other processing nodes with a set of weight values. However, in these embodiments, the processing node do not compute a modulo division on the output of the linear operator before supplying this output to its periodic non-linear operator. In these embodiments, the result of the dot product computed by the node's linear operator is supplied "as is" to the node's periodic nonlinear operator.

Other embodiment, on the other hand, use the modulo division in conjunction with a non-periodic, non-linear operator. Specifically, in these embodiments, each processing node in multiple layers of processing nodes of the MT network has a linear operator (i.e., linear component) and a nonlinear, non-periodic operator (i.e., a non-linear, non-periodic component). Again, in some of these embodiments, the linear operator of each node computes a dot product of a set of outputs of nonlinear operators of other processing nodes with a set of weight values. In these embodiments, the processing node then computes a modulo division on the output of the linear operator before supplying this modulo-divided output to its non-linear operator. In other embodiments, the node's linear operator performs the modulo division on the weight values and the outputs of the non-linear operators of other processing nodes, before computing the dot product based on the result of the modulo division operations (i.e., based on the set of weight values and the set of output values after the modulo operation), and then computing another modulo division operation on the output of the dot product. The modulo operation in some embodiments is performed based on a number that defines a range of input values for the nonlinear operator. The modulo operation renders the non-periodic non-linear operator into a periodic non-linear operator as it confines this operator's input values to a particular range of values, which confines its output values to another particular range.

In some embodiments, the constant parameters of the linear and nonlinear components of the processing nodes are adjusted during the training of the MT network, as the MT network processes input data sets with known output data sets and then back propagates errors in the network-generated output data sets through the network. The back propagation process of some embodiments is a generalization of the delta rule that is applied to a multi-layered feed-forward network. This process is made possible by using the chain rule to iteratively compute gradients for each layer. Back propagation process of some embodiments requires that the activation functions of the nonlinear operators of the processing nodes to be differentiable. The chain rule expresses the derivative of the composition of two or more functions (e.g., functions z and y, such z(y(x)) in terms of the product of the partial derivatives of these functions (e.g., $\delta z/\delta x$ equals $\delta z/\delta y$ product $\delta y/\delta x$).

Figure 10:
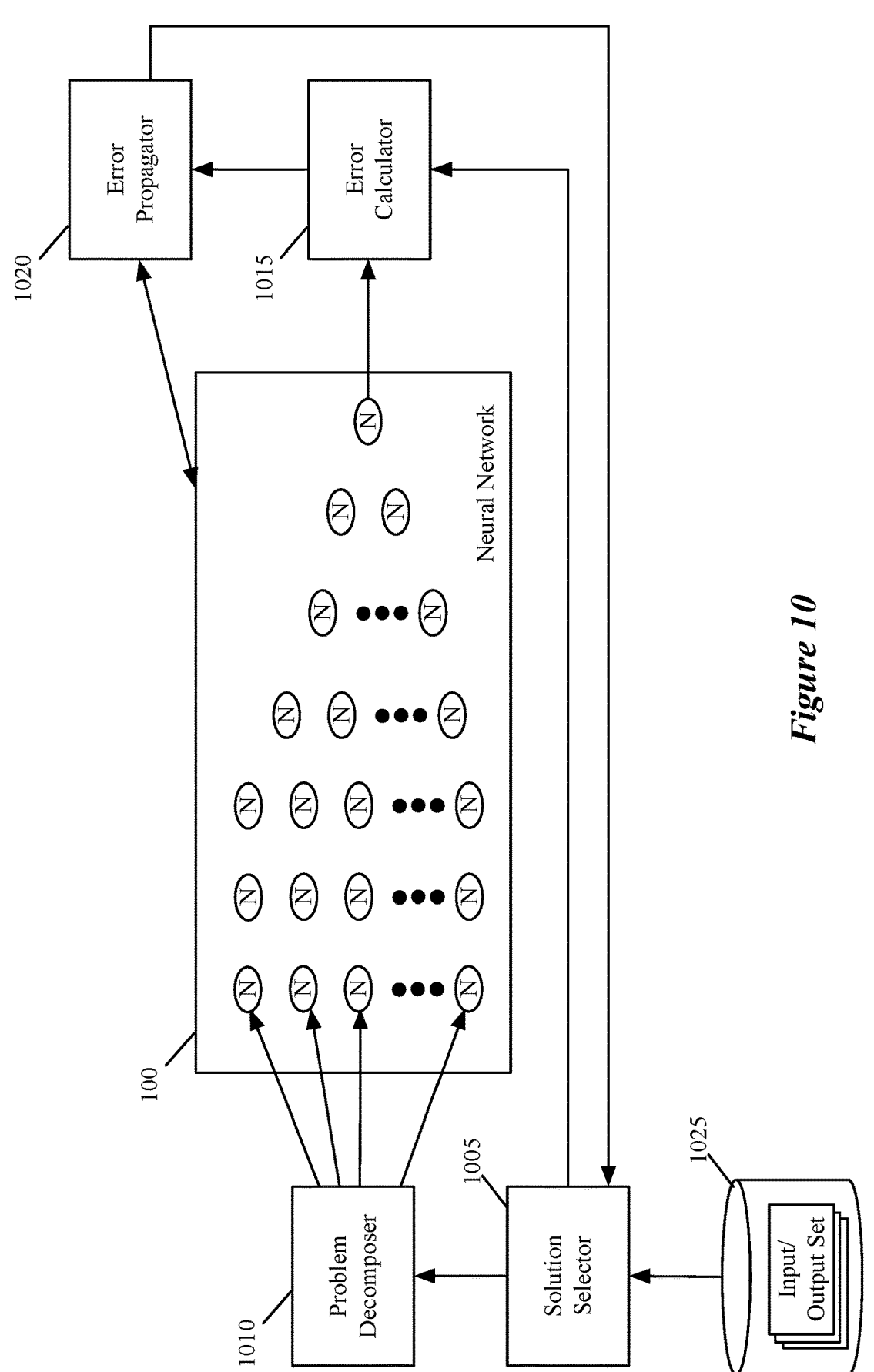
FIG. 10 illustrates a set of modules of some embodiments that perform a back propagation process that uses multiple known training set solutions to train the MT network.

FIG. 10 illustrates a set of modules of some embodiments that perform a back propagation process that uses multiple known training set solutions to train the MT network 100. As shown, these modules include a solution selector 1005, an input selector 1010, an error calculator 1015, and an error propagator 1020. In some embodiments, all of these modules execute on one device, such as a mobile device (e.g., smartphone, tablet, etc.) or an IoT device. In other embodiments, these modules are performed on a different device than the device the eventually executes the MT network 100. FIG. 11 illustrates the back-propagation process 1100 that the modules of FIG. 10 perform.

As shown in FIG. 11, the solution selector 1005 initially selects (at 1105) a known solution set from the training set of solutions that are stored in a data storage 1025. In some embodiments, the data storage 1025 is on the same device that executes the modules 1005-1020 of FIG. 10, while in other embodiments, this data storage is on a remote server. The selected solution set includes a set of input values and a set of output values. The output value set is the set of output values that the MT network should generate for the input value set of the selected solution set. In other words, the output value set is the known/desired output value set for the input value set. For example, in some embodiments, the MT network 100 determines whether video frames include faces. For these embodiments, each input/output set in the training set includes (1) a pixel value set of a video frame as the input value set, and (2) a Boolean output value that indicates whether the video frame has a face.

At 1110, the input selector 1010 selects the inputs to the MT network's input nodes from the set of input values selected at 1105. For the above-described face recognition problem, the input selector 1010 in some embodiments supplies different sets of pixel values from the video frame as inputs to different input nodes of the MT network 100. Next, at 1115, the MT network 100 processes the supplied input values to produce a set of output values. In some embodiments, this processing entails each processing node of the MT network first having its linear operator 110b compute a weighted sum of its input, and then having its nonlinear activation operator 115b compute a function based on the output of the linear component.

Figures 12, 13:
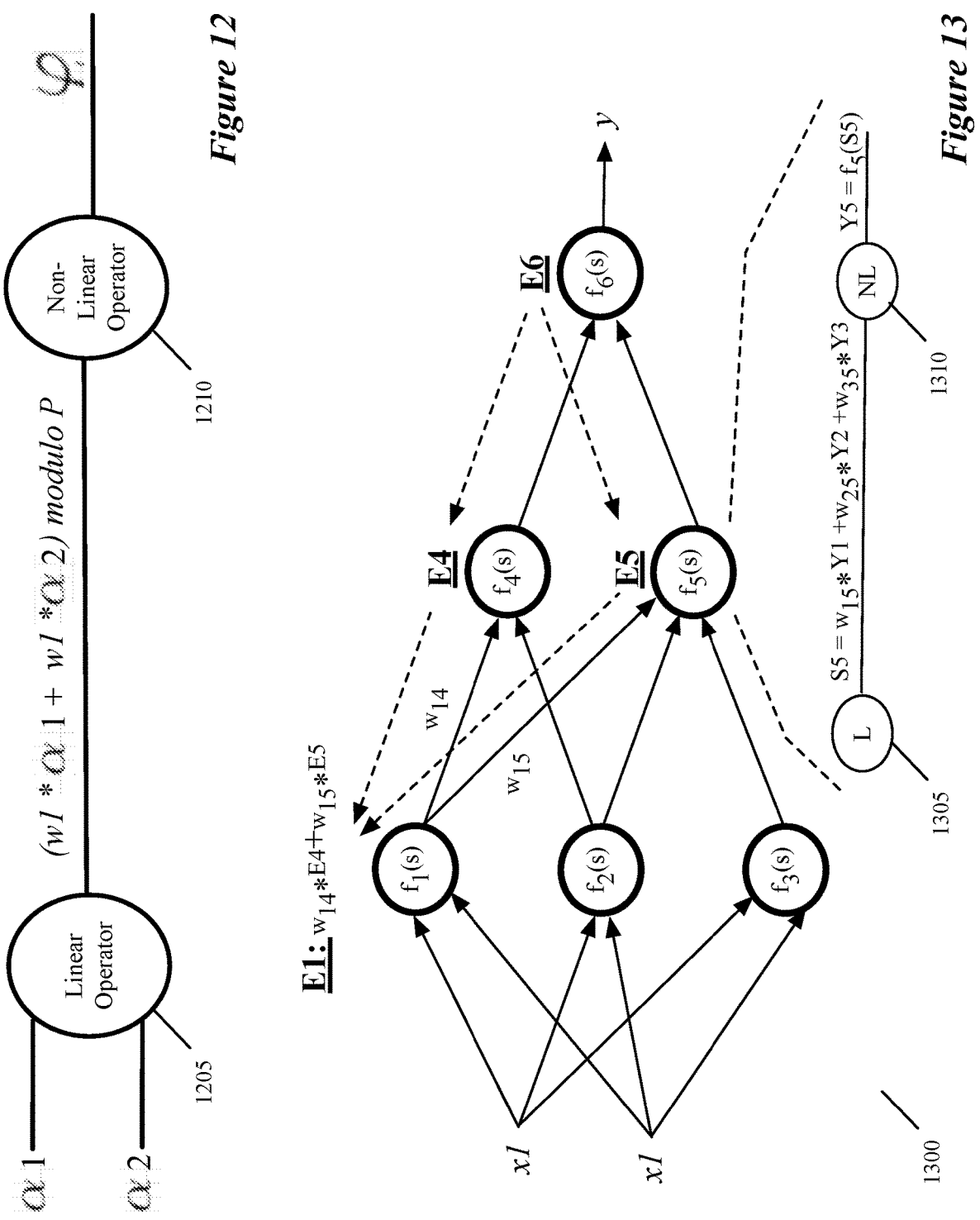
FIG. 12 illustrates that when an activation operator uses a periodic function, the linear operator performs a modulo division based on the period P of the periodic function.
FIG. 13 illustrates an example of a simple MT network in order to explain how some embodiments perform back propagation.

FIG. 12 illustrates that when an activation operator 1210 uses a periodic function, the linear operator 1205 performs a modulo division based on the period P of the periodic function. The linear operator performs the modulo operation because each activation-operator input value that is greater than the period has a corresponding input value (that produces the same activation-operator output value) in the input value range 0 to P. As mentioned above, the linear operator 1205 in some embodiments performs the modulo operation on the weight values and on its inputs, before computing the dot products of the modulo-divided input and weight values and then performing another modulo division on the result of this dot product, as explained above by reference to Equation (B). This allows the linear and nonlinear operators to be smaller, faster and less power hungry, and it allows these operators to produce lower resolution numbers.

At 1120, the error calculator 1015 computes a set of error values from (1) the output value set produced by the MT network for the supplied input value set, and (2) the output value set from the selected training input/output solution (selected at 1105). As shown, the error calculator 1015 receives the training set's output value(s) from the solution selector 1005 in some embodiments. In the example illustrated in FIG. 10, the MT network 100 has one output processing node that produces just one output value. In other embodiments, the MT network produces multiple values in its output value set from one or more output processing nodes. For the above-mentioned facial recognition example, the MT-network produced output value in some embodiments is a value in a range (e.g., 0 to 1) with numbers above one particular value in the range representing 1 or True and numbers below the particular value representing 0 or False. For a selected input/output value set, the desired output value in some embodiments would be the value at one end of the range.

For each output value in the output value set, the error calculator 1015 computes (at 1120) an error value by subtracting the MT-network produced output value from the desired output value. At 1125, the error calculator 1015 provides the error value set that it computes to the error propagator 1020, which then coordinates the back propagation of this error value set through the processing nodes of the MT network. In some embodiments, each processing node is an instantiated object that includes a back-propagation function for handling back-propagation calls from the error propagator 1020. In these embodiments, each time the error propagator 1020 calls a processing node's back-propagation function, this function computes adjustments to the parameter(s) of the node's linear operator and/or nonlinear operator and returns to the error propagator 1020 error values to propagate back to each of the inputs of the node's linear operator. To call the propagating function of a particular processing node that is not an output processing node, the error propagator 1020 in some embodiments aggregates (e.g., sums) the error values that it has receives from all processing nodes when more than one processing node receives the particular processing node's output, and then supplies the aggregated error value to the particular processing node's propagating function. The back-propagation operation will be further described below by reference to FIG. 13.

After the computed error value is back propagated through the processing nodes of the MT network and one or more of these nodes adjust their linear and/or nonlinear operator parameters during this back propagation, the error propagator 1020 notifies the solution selector 1005 that it has completed its error propagation. Next, at 1130, the solution selector 1005 determines whether it should stop the training of the MT network. In some embodiments, the solution selector 1005 uses a minimization process (e.g., a stochastic gradient descent minimizer) to determine when it should stop the training of the MT network. When the solution selector 1005 determines that it should continue the training, the process 1100 returns to 1105 to select another training solution from the storage 1025, and then repeats operations 1110-1130 for this selected solution. In some embodiments, the process 1100 can iterate multiple times through one training solution (i.e., one input/output set), while this process is training the configurable parameters of the MT network 100. The process 1100 ends when the solution selector 1005 determines that it does not need to continue the training.

FIG. 13 illustrates an example of a simple MT network 1300 in order to explain how some embodiments perform back propagation. In this example, the MT network has six processing nodes. As shown by the fifth node, each processing node has (1) a linear operator 1305 that computes a dot product of a set of weights coefficients and a set of inputs of the linear operator (i.e., computes a weighted sum of its inputs), and (2) a nonlinear operator 1310 that computes an activation function Y based on the linear operator outputs. In some embodiments, the nonlinear function is periodic, and the output of the linear operator is modulo divided by using the period of the nonlinear periodic function.

In the example illustrated in FIG. 13, each weight coefficient $w_{kj}$ of an interior or output node has a two-number subscript, with the first number identifying the processing node that supplies the input associated with the coefficient and the second number identifying the processing node that receives this input. Also, in this example, the output of the nonlinear operator of each processing node is the output of the processing node.

This example illustrates that the output error E6 (which is the error in the output node 6) is used to derive the errors E4 and E5 in the output of the fourth and fifth nodes during a back propagation operation. It also illustrates that the error E1 in the output of node 1 is derived as a weighted sum of the errors in the outputs of fourth and fifth nodes to which the output of node 1 is supplied. As shown for the output error of node 1, the weight coefficients $w_{kj}$ used to propagate errors back are equal to the weight coefficients used during the computation of the node output values. Only the direction of data flow is changed, where error values are propagated from output to inputs one after the other. This technique is used for all network layers.

After the error value for each processing node is computed, the weight coefficients of each node's input can be modified. For example, in some embodiments, the back propagation function for node 4 adjusts the weight coefficient $w_{14}$ (which the linear operator of node 4 multiplies with the input from node 1) as follows:

$$w'_{14} = w_{14} + h(E4)(\delta f_4(S)/\delta S)Y1,$$

where h is a training coefficient, $\delta f_4(S)/\delta S$ represents partial derivative of activation function of node 4, and Y1 is the output of node 1. The parameter h affects network teaching speed. The derivative of the activation function is often expressed as a function itself. For the sin-derived cirque function described above by reference to Equation (C), the partial derivative function can be expressed as $$f'(x) = \frac{4}{\pi}(\cos x + \cos(3x) + \cos(5x))$$

The embodiments that use the sin-derived cirque activation function do not adjust the parameters of this activation function during the back propagation operation. However, other embodiments use other sin-derived cirque activation functions that do have configurable parameters that are adjusted during the back propagation. These embodiments adjust the parameters of the activation operators by using the chain rule to take partial derivatives of the activation functions with respect to each adjustable activation-operator parameter.

Figure 14:
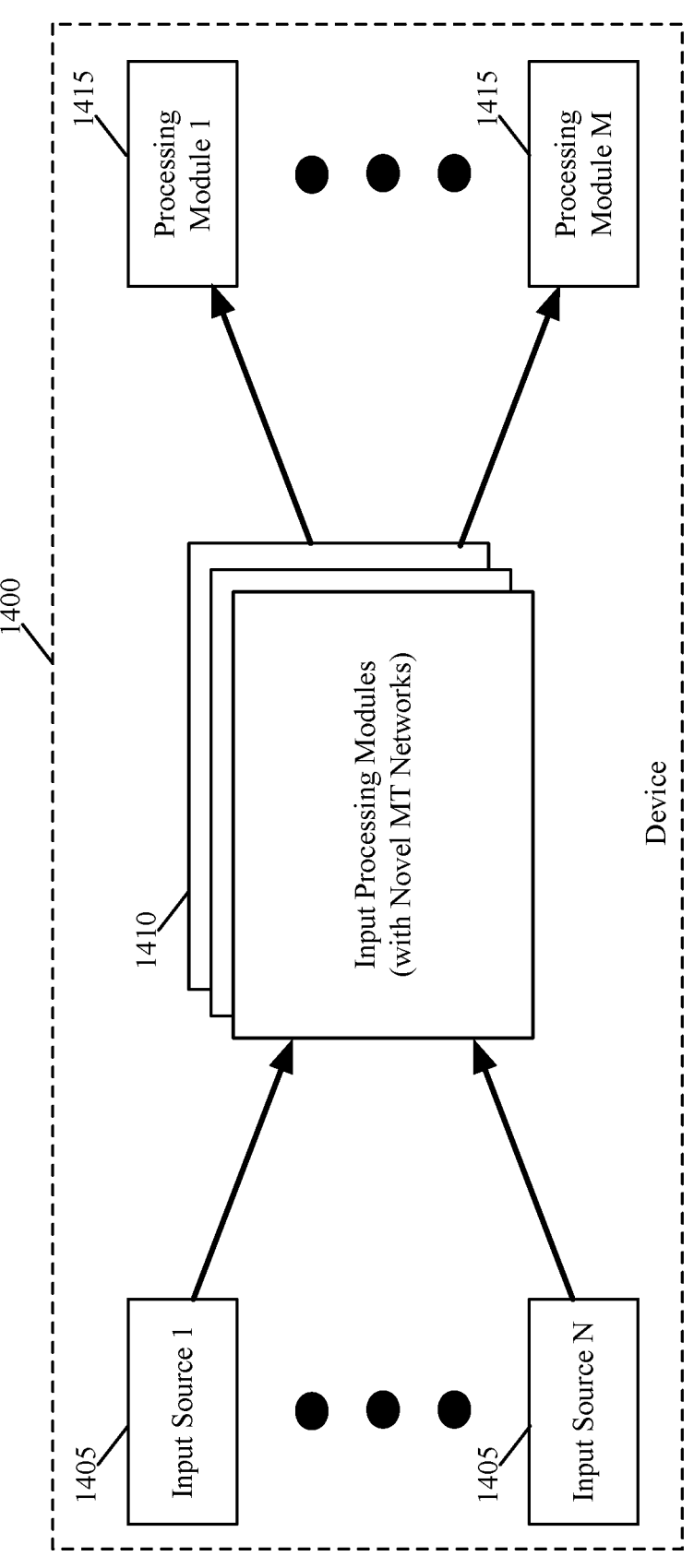
FIG. 14 illustrates an example of a device that implements the MT network of some embodiments of the invention.

Because of the smaller size of the MT networks of some embodiments, one device can implement one or more of these MT networks to perform one or more set of tasks. FIG. 14 illustrates an example of such a device 1400. This device is a mobile device (e.g., a smartphone, tablet, etc.) in some embodiments, while it is a resource-constrained IoT device in other embodiments. As shown, the device 1400 includes multiple input sources 1405. Examples of these input sources 1405 include software or firmware modules that execute on the device 1400 to process data (e.g., raw captured data) from the device's image capture component (e.g., a camera), audio capture component (e.g., microphone and audio processor), and one or more sensors (e.g., motions sensors, touch-sensitive sensors, etc.).

The device 1400 also includes multiple input processing modules 1410 that process inputs captured by the input sources 1405 of the device, and provide processed output data to one or more other processing modules 1415 of the device, which then perform other operations based on the processed output data that they receive. As shown, one or more of the input processing modules 1410 in some embodiments use the MT networks of some embodiments to process their input data and to produce the processed output data. For instance, in some embodiments, one of the input processing modules 1410 is an image processing operation that uses a MT network 100 to recognize faces in a video captured by a camera 1405, tags each face in each image, and provides the tagged images to an image processing module 1415 for performing another image processing operation (e.g., a color correction operation). In some embodiments, another input processing module 1410 is voice recognition module that uses a MT network 100 to recognize voices in audio captured by a microphone of the device, tags the voices in the captured audio ranges, and provides the tagged audio ranges to another voice processing module 1415 for performing other audio processing operations.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage that can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
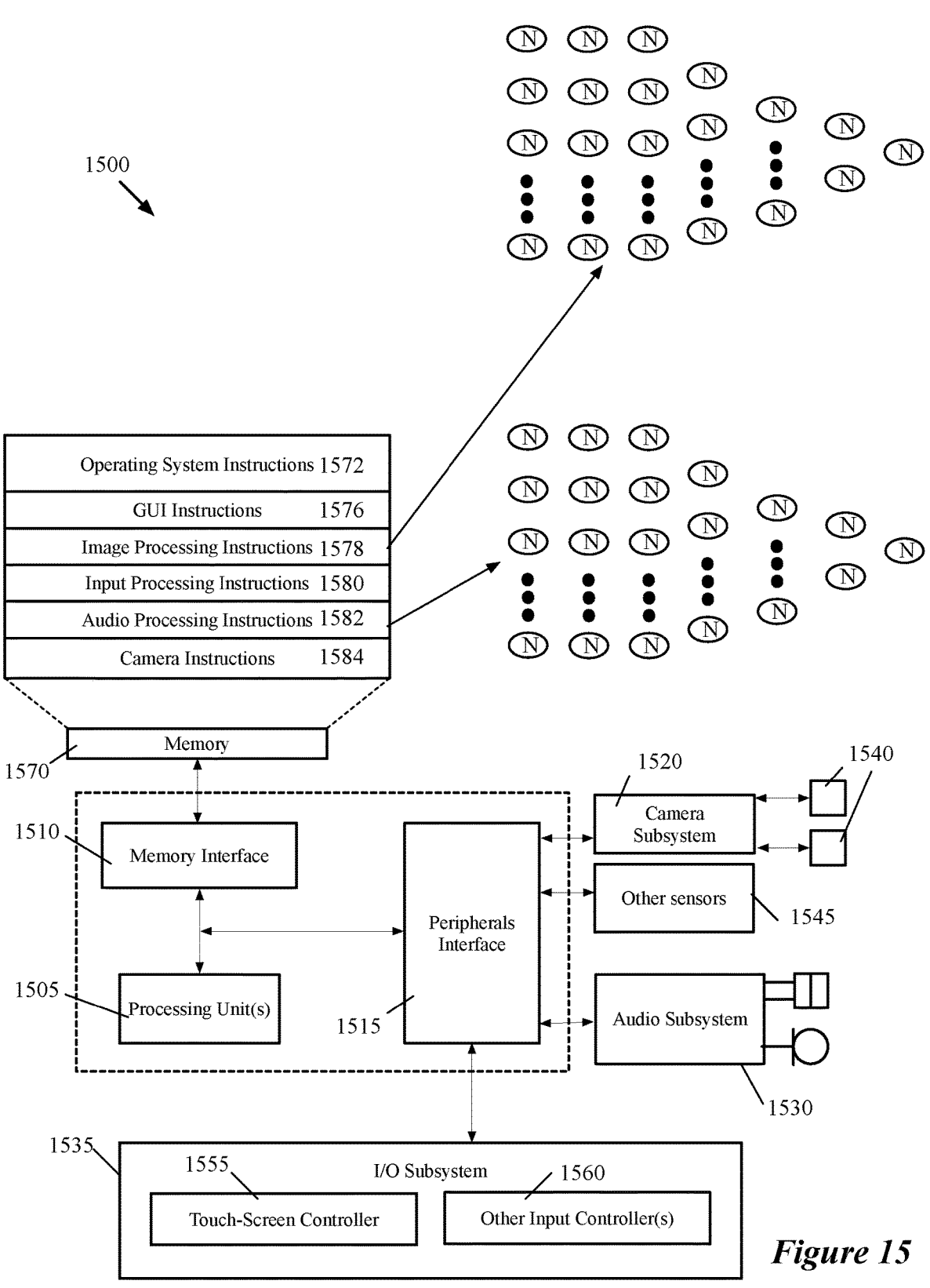
FIG. 15 illustrates an example of the architecture of a mobile device that implements some embodiment of the invention.

Some embodiments of the invention operate on mobile devices, such as smart phones (e.g., iPhones®) and tablets (e.g., iPads®). FIG. 15 is an example of an architecture 1500 of such a mobile computing device. Examples of mobile computing devices include smartphones, tablets, laptops, etc. As shown, the mobile computing device 1500 includes one or more processing units 1505, a memory interface 1510 and a peripherals interface 1515.

The peripherals interface 1515 is coupled to various sensors and subsystems, including a camera subsystem 1520, an audio subsystem 1530, an I/O subsystem 1535, and other sensors 1545 (e.g., motion sensors), etc. The peripherals interface 1515 enables communication between the processing units 1505 and various peripherals. For example, an orientation sensor (e.g., a gyroscope) and an acceleration sensor (e.g., an accelerometer) can be coupled to the peripherals interface 1515 to facilitate orientation and acceleration functions. The camera subsystem 1520 is coupled to one or more optical sensors 1540 (e.g., a charged coupled device (CCD) optical sensor, a complementary metal-oxide-semiconductor (CMOS) optical sensor, etc.). The camera subsystem 1520 and the optical sensors 1540 facilitate camera functions, such as image and/or video data capturing.

The audio subsystem 1530 couples with a speaker to output audio (e.g., to output voice navigation instructions). Additionally, the audio subsystem 1530 is coupled to a microphone to facilitate voice-enabled functions, such as voice recognition (e.g., for searching), digital recording, etc. The I/O subsystem 1535 involves the transfer between input/output peripheral devices, such as a display, a touch screen, etc., and the data bus of the processing units 1505 through the peripherals interface 1515. The I/O subsystem 1535 includes a touch-screen controller 1555 and other input controllers 1560 to facilitate the transfer between input/ output peripheral devices and the data bus of the processing units 1505. The touch-screen controller couples with a touch screen (not shown) to detect contact and movement on the touch screen using any of multiple touch sensitivity technologies. The other input controllers 1560 are coupled to other input/control devices, such as one or more buttons.

In some embodiments, the device includes wireless communication subsystem (not shown in FIG. 15) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 1510 is coupled to memory 1570. In some embodiments, the memory 1570 includes volatile memory (e.g., high-speed random access memory), non-volatile memory (e.g., flash memory), a combination of volatile and non-volatile memory, and/or any other type of memory. As illustrated in FIG. 15, the memory 1570 stores an operating system (OS) 1572. The OS 1572 includes instructions for handling basic system services and for performing hardware dependent tasks.

The memory 1570 also stores (1) graphical user interface instructions 1576 to facilitate graphic user interface processing; (2) image processing instructions 1578 to facilitate image-related processing and functions; (3) input processing instructions 1580 to facilitate input-related (e.g., touch input) processes and functions; (4) audio processing instructions 1582 to facilitate audio-related processes and functions; and (5) camera instructions 1584 to facilitate camera-related processes and functions. As shown, the image processing instructions 1578 and the audio processing instructions 1582 include instructions for implementing MT networks of some embodiments of the invention. The processing units 1510 execute the instructions stored in the memory 1570 in some embodiments.

The memory 1570 further stores communication instructions to facilitate communicating with one or more additional devices. The instructions described above are merely exemplary and the memory 1570 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 15 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 15 may be split into two or more integrated circuits.

While the invention has been described with reference to numerous specific details, one of ordinary skill in the art will recognize that the invention can be embodied in other specific forms without departing from the spirit of the invention. One of ordinary skill in the art would understand that the invention is not to be limited by the foregoing illustrative details, but rather is to be defined by the appended claims.

The invention claimed is:

1. A method comprising:

determining, based on first inference-time data and based on first weight data representing weights associated with a first layer of a machine-trained (MT) network, second inference-time data representing a first set of values;

determining, based on the second inference-time data and configuration data associated with the first layer of the MT network, third inference-time data representing a second set of values, wherein the configuration data was determined during training of the MT network and defines activation functions for each node of the first layer of the MT network, and wherein determining the third inference-time data comprises:

determining, using a first activation function of a first node of the first layer, a first value based on the second inference-time data and a third set of values, indicated by the configuration data, representing parameters of the first activation function, wherein the parameters at least partially define a first piecewise linear function, and determining, using a second activation function of a second node of the first layer, a second value based on the second inference-time data and a fourth set of values, indicated by the configuration data, representing parameters of the second activation function, wherein the parameters at least partially define a second piecewise linear function different than the first piecewise linear function; and generating, based on the third inference-time data, output data representing output of the MT network.

2. The method of claim 1, wherein the third set of values represents parameters at least partially defining a first piecewise linear cup function, and wherein the fourth set of values represents parameters at least partially defining a second piecewise linear cup function different than the first piecewise linear cup function.

3. The method of claim 1, wherein the third set of values represents parameters including a first parameter indicating a domain limitation for a first linear equation of the first piecewise linear function.

4. The method of claim 1, wherein the third set of values represents parameters including a first parameter and a second parameter indicating domain limitations for a first linear equation of the first piecewise linear function.

5. The method of claim 1, wherein the third set of values represents parameters including a first parameter indicating a parameter value for a first linear equation associated with a first portion of a domain of the first piecewise linear function.

6. The method of claim 1, wherein the third set of values represents parameters including a first parameter indicating a slope value for a first linear equation associated with a first portion of a domain of the first piecewise linear function.

7. The method of claim 1, wherein the third set of values represents parameters including a first parameter indicating a y-intercept value for a first linear equation associated with a first portion of a domain of the first piecewise linear function.

8. The method of claim 1, wherein the third set of values represents parameters including a first parameter indicating a constant range value for a first portion of a domain of the first piecewise linear function.

9. The method of claim 1, wherein the first piecewise linear function being defined to have:

a first domain interval associated with a linear function having a negative slope, a second domain interval associated with a linear function having zero slope, and a third domain interval associated with a linear function having a positive slope.

* * * * *